(12) United States Patent
Todorovic

(10) Patent No.: US 9,657,593 B2
(45) Date of Patent: May 23, 2017

(54) AIRCRAFT GAS TURBINE HAVING A CORE ENGINE CASING WITH COOLING-AIR TUBES

(71) Applicant: Rolls-Royce Deutschland Ltd & Co KG, Blankenfelde-Mahlow (DE)

(72) Inventor: Predrag Todorovic, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 289 days.

(21) Appl. No.: 14/559,527

(22) Filed: Dec. 3, 2014

(65) Prior Publication Data

US 2015/0292357 A1    Oct. 15, 2015

(30) Foreign Application Priority Data

Dec. 5, 2013   (DE) .................. 10 2013 224 982

(51) Int. Cl.
| | |
|---|---|
| *F01D 25/14* | (2006.01) |
| *F02C 7/18* | (2006.01) |
| *F01D 25/24* | (2006.01) |
| *F02C 3/13* | (2006.01) |
| *F01D 25/30* | (2006.01) |

(52) U.S. Cl.
CPC ........... *F01D 25/14* (2013.01); *F01D 25/243* (2013.01); *F01D 25/30* (2013.01); *F02C 3/13* (2013.01); *F02C 7/18* (2013.01); *F05D 2220/323* (2013.01); *F05D 2230/10* (2013.01); *F05D 2230/232* (2013.01); *F05D 2230/53* (2013.01); *F05D 2230/60* (2013.01);

(Continued)

(58) Field of Classification Search
CPC ...... F01D 25/14; F01D 25/243; F01D 25/145; F01D 25/30; F02C 7/18; F02C 3/13; F05D 2220/323; F05D 2240/14; F05D 2230/10; F05D 2230/232; F05D 2230/53; F05D 2230/60; F05D 2260/20
See application file for complete search history.

(56) References Cited

U.S. PATENT DOCUMENTS

| | | | |
|---|---|---|---|
| 2,827,760 | A | 3/1958 | Ivor et al. |
| 3,641,766 | A | 2/1972 | Uehling |

(Continued)

FOREIGN PATENT DOCUMENTS

| | | |
|---|---|---|
| DE | 3011503 | 10/1980 |
| DE | 4315256 | 11/1994 |

(Continued)

OTHER PUBLICATIONS

European Search Report dated Mar. 4, 2015 for counterpart European Application No. 14194722.6.

(Continued)

*Primary Examiner* — Richard Edgar
*Assistant Examiner* — Jesse Prager
(74) *Attorney, Agent, or Firm* — Shuttleworth & Ingersoll, PLC; Timothy Klima

(57) ABSTRACT

An aircraft gas turbine having a core engine casing for a core engine, said core engine casing including at least a compressor area, a combustion chamber area and a turbine area, wherein the core engine casing is provided on its outer wall with several cooling-air tubes which are designed in one piece with said outer wall and extend in the axial direction relative to an engine axis.

5 Claims, 5 Drawing Sheets

Figure 1:
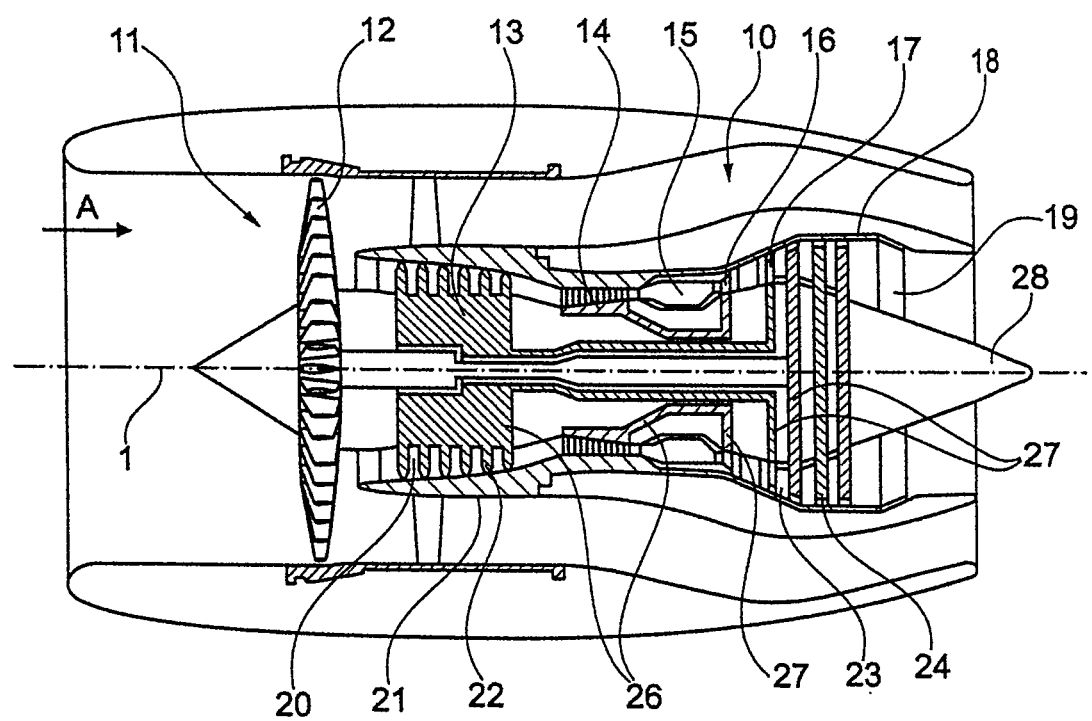

(52) U.S. Cl.
CPC ...... *F05D 2240/14* (2013.01); *F05D 2260/20* (2013.01); *Y02T 50/676* (2013.01)

(56) References Cited

U.S. PATENT DOCUMENTS

| | | | | |
|---|---|---|---|---|
| 4,412,782 | A * | 11/1983 | Monsarrat | F01D 11/08 415/108 |
| 4,471,609 | A * | 9/1984 | Porter | B64D 27/18 244/117 A |
| 5,645,127 | A | 7/1997 | Enderle et al. | |
| 6,112,514 | A * | 9/2000 | Burdisso | B64D 33/02 181/213 |
| 6,227,800 | B1 | 5/2001 | Spring et al. | |
| 6,761,031 | B2 | 7/2004 | Bunker | |
| 6,789,316 | B2 * | 9/2004 | Haggander | F02K 9/64 29/428 |
| 6,920,750 | B2 * | 7/2005 | Haggander | F02K 9/48 239/127.1 |
| 7,687,021 | B2 | 3/2010 | Imbourg et al. | |
| 8,181,443 | B2 * | 5/2012 | Rago | F01D 11/24 415/116 |
| 8,342,443 | B2 | 1/2013 | Gatzke | |
| 8,708,647 | B2 * | 4/2014 | Boman | F02C 7/12 415/177 |
| 2005/0252194 | A1 | 11/2005 | Orlando et al. | |
| 2009/0180872 | A1 | 7/2009 | Lundgren | |
| 2011/0247344 | A1 | 10/2011 | Glahn et al. | |

FOREIGN PATENT DOCUMENTS

| | | | |
|---|---|---|---|
| DE | 102008007278 | 8/2009 | |
| FR | 2961857 | 12/2011 | |
| GB | 2048386 | 12/1980 | |
| GB | 2057574 | 4/1981 | |
| GB | 2089434 A * | 6/1982 | ............... F02K 1/82 |
| GB | 2377973 | 1/2003 | |

OTHER PUBLICATIONS

German Search Report dated Mar. 25, 2014 from counterpart App No. 10 2013 224 982.9.

* cited by examiner

AIRCRAFT GAS TURBINE HAVING A CORE ENGINE CASING WITH COOLING-AIR TUBES

This application claims priority to German Patent Application DE102013224982.9 filed Dec. 5, 2013, the entirety of which is incorporated by reference herein.

This invention relates to an aircraft gas turbine having a core engine casing with cooling-air tubes.

In particular, the invention relates to an aircraft gas turbine having a core engine casing for a core engine, said core engine casing being provided on its outside with cooling-air tubes in order to supply cooling air from the compressor to a combustion chamber area and/or to a turbine area.

Modern turbofan gas turbines increasingly use smaller core engines which are operated at high or very high temperatures. This results in a smaller installation space radially outside the core engine casing for installing parts and components. This also applies to the supply of cooling air from the compressor area to the combustion chamber area or turbine area respectively, since the space available between the core engine casing and an inner wall of a bypass duct is very narrow.

The measures known from the state of the art, i.e. installing separate tubes in a classic arrangement, can therefore be ruled out. Examples for separate tube connections of this type are shown in U.S. 2005/0252194 A1, U.S. Pat. No. 3,641,766 or GB 2 377 973 A. Due to the small installation space, it is not possible either to provide annular ducts for the cooling air, as already known from U.S. 2011/0247344 A1 or U.S. Pat. No. 6,227,800 B1. Annular ducts in, such a small installation space are very loss-prone and not efficient, since the boundary conditions for the airflow radially outside and radially inside are unfavourable due to their proximity.

With the solutions known from the state of the art, in particular for the installation of separate tube systems, there is the further disadvantage that a large number of complex components is needed, which require a high production and assembly effort and are unfavourable in terms of thermal loading, in particular of the core engine casing. In addition, separate tube systems require additional measures (curvatures of tubes) to allow for thermal expansions or contractions.

The object underlying the present invention is to provide a core engine casing of an aircraft gas turbine, which, while being simply designed and easily and cost-effectively producible, avoids the disadvantages of the state of the art and ensures both, an optimized cooling air routing and optimized thermal operating conditions.

It is a particular object to provide a solution to the above problems by a combination of features described herein. Further advantageous embodiments will become apparent from the present description.

In detail, it is thus provided in accordance with the invention that cooling-air tubes which extend substantially in the axial direction relative to the engine axis are provided on the outer wall of the core engine casing and in one piece with said outer wall.

The one-piece embodiment with the core engine casing means that very little installation space is needed, since the walls of the cooling-air tubes, which can have a circular or other cross-section as required, also act as the wall of the core engine casing. This results in a very compact design. The distances prevailing in the state of the art between the outer wall of the core engine casing and separate tubes are thus avoided. This also makes it easier to attach further components to the core engine casing, as the installation space thus available is not limited by tubing. In the state of the art, a minimum distance is always needed between the tubes and other structural elements. Alternatively, it is possible to further reduce the space between the outer wall of the core engine casing and the inner wall of the bypass duct. Furthermore, it is not necessary in accordance with the invention, to provide curvatures in tubes to allow for thermal expansions and contractions.

Due to direct mounting and integration of the cooling-air tubes into the outer wall of the core engine casing, cooling of the core engine casing by the cooling air conveyed by the cooling-air tubes is achieved at the same time.

The cooling-air tubes connected in one piece to the outer wall also result in additional stability and strength of the core engine casing, so that its wall can be designed with a thinner cross-section. In addition, vibrations are suppressed and there are also smaller thermal tip clearance fluctuations relative to blades arranged inside the core engine casing, for example in the turbine area.

Since the core engine casing is usually made by metal-cutting production methods, it is possible in a particularly simple way to design the cooling-air tubes, in respect of their outer contour, in one piece with the core engine casing. The cooling-air tubes can then be drilled or milled to provide them with the internal diameter required. If necessary, separate connecting fittings can be dispensed with, since openings can be provided directly into the cooling-air tubes from the inside of the outer wall of the core engine casing. Front-side openings of the cooling-air tubes can be closed by means of sealing plugs or similar.

In a particularly favourable embodiment of the invention, it is provided that the core engine casing is divided into individual areas, in particular the compressor area, combustion chamber area and turbine area, which are made separately and then put together. It is favourable here when the cooling-air tubes too are connected at the ends during assembly. This can if necessary be achieved with the insertion of seals or similar between them.

It is particularly favourable when the individual areas of the core engine casing are connected to one another by means of flanges. The cooling-air tubes can here extend through the flanges, so that the latter can also be tightly connected to one another in a correspondingly simple way, as this is achieved by sealing off the casing areas from one another.

Alternatively to production of the cooling-air tubes together with the respective areas of the core engine casing, it is also possible to produce the cooling-air tubes separately and then connect them by means of a suitable joining method, for example by welding, to the outer wall of the core engine casing.

Several cooling-air tubes are preferably spread aver the circumference, so that optimum conditions are achieved with regard to the cooling of the entire core engine casing and to the increase in the mechanical strength.

The cooling-air tubes provided in accordance with the invention can also extend over differing axial part-areas of the core engine casing, for example from the compressor area to the combustion chamber area or from the compressor area to the turbine area.

Figure 2:
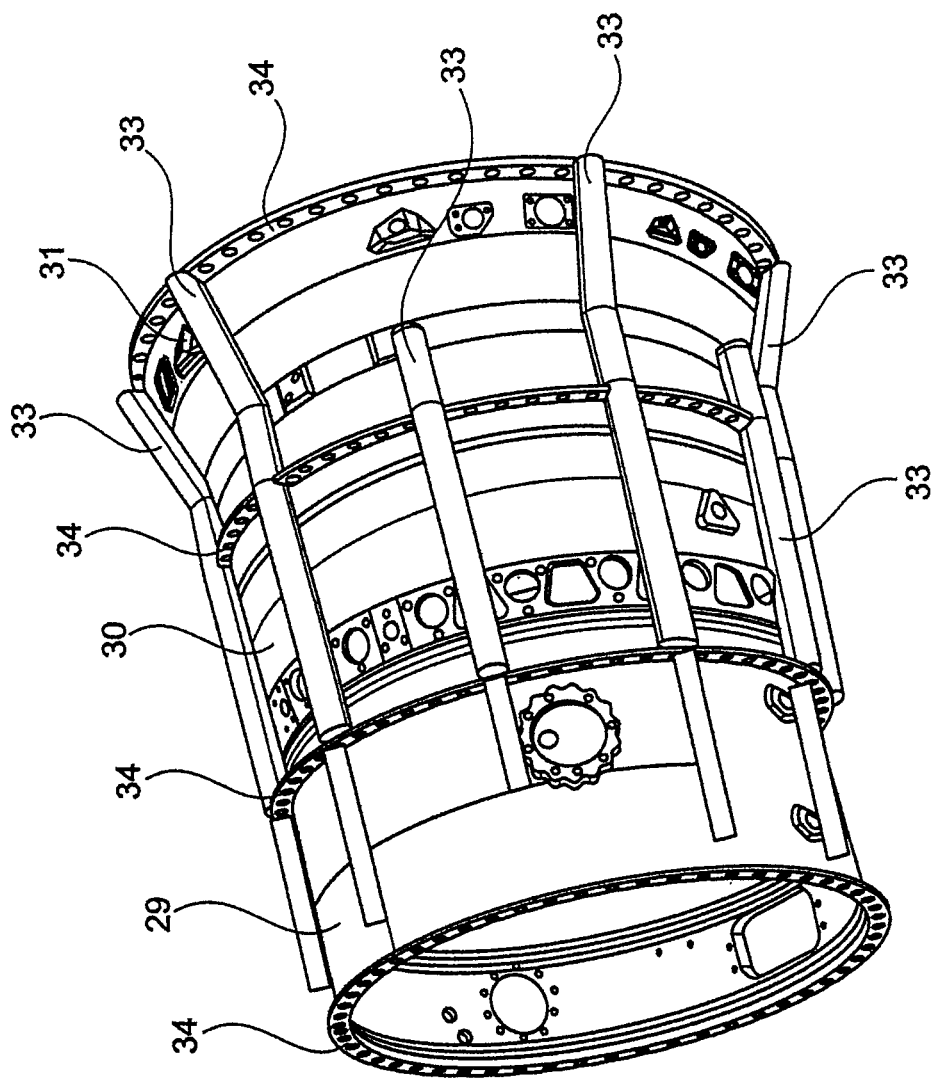
Figure 3:
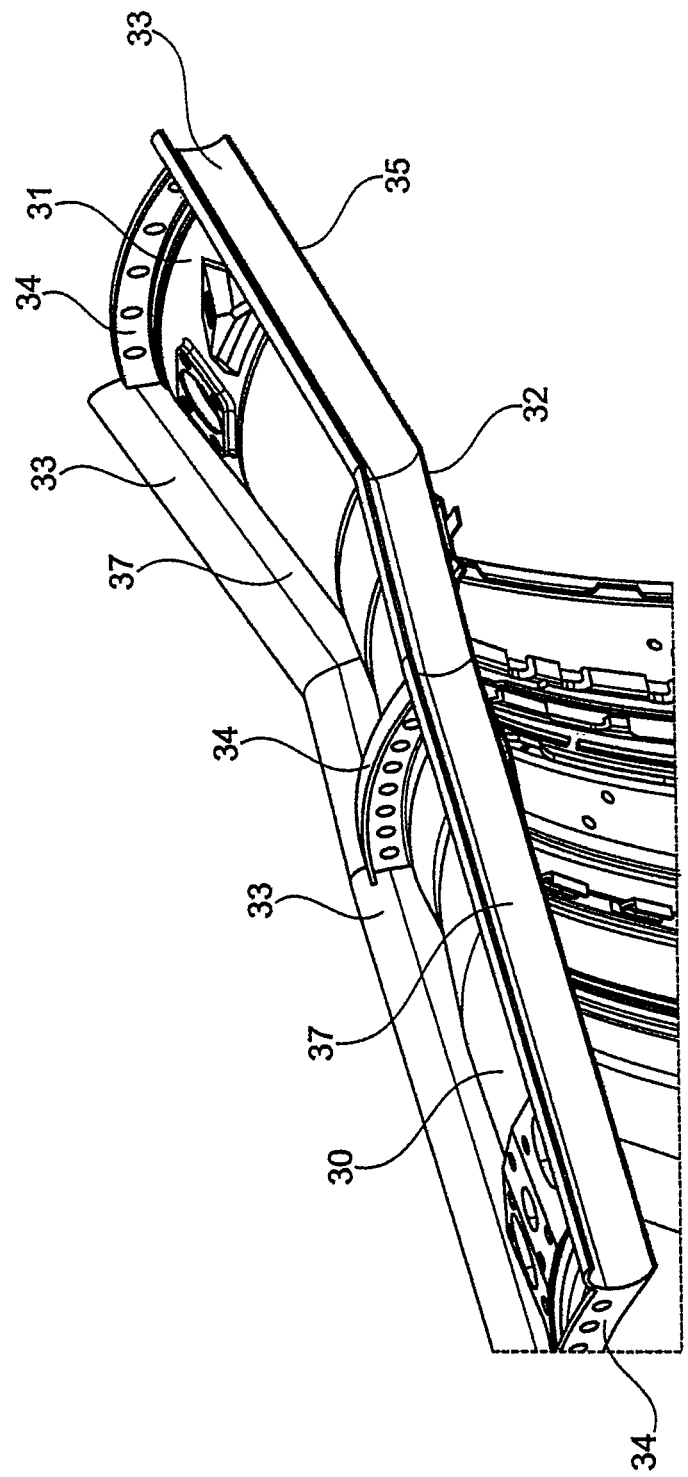
Figure 4:
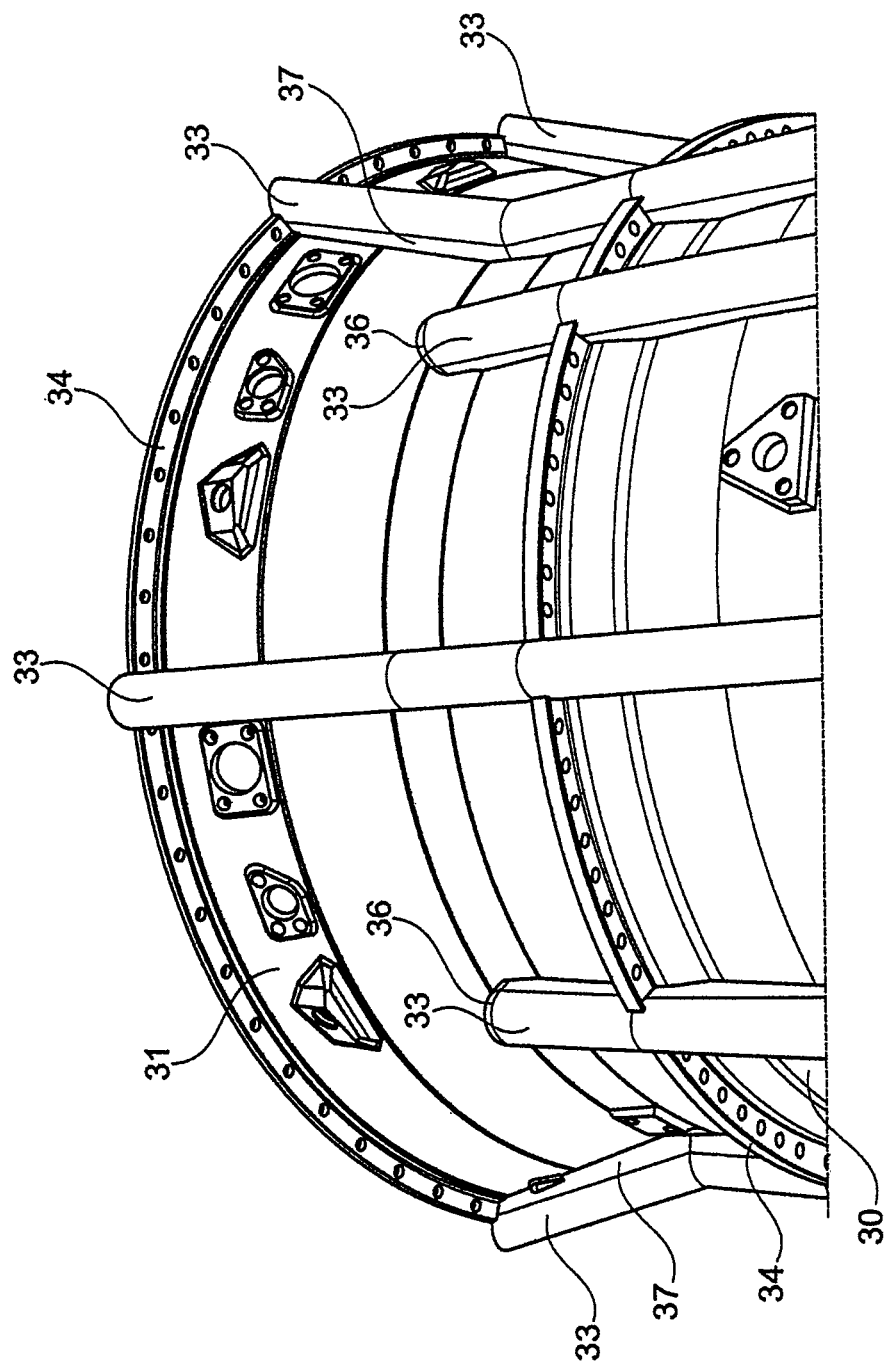
Figure 5:
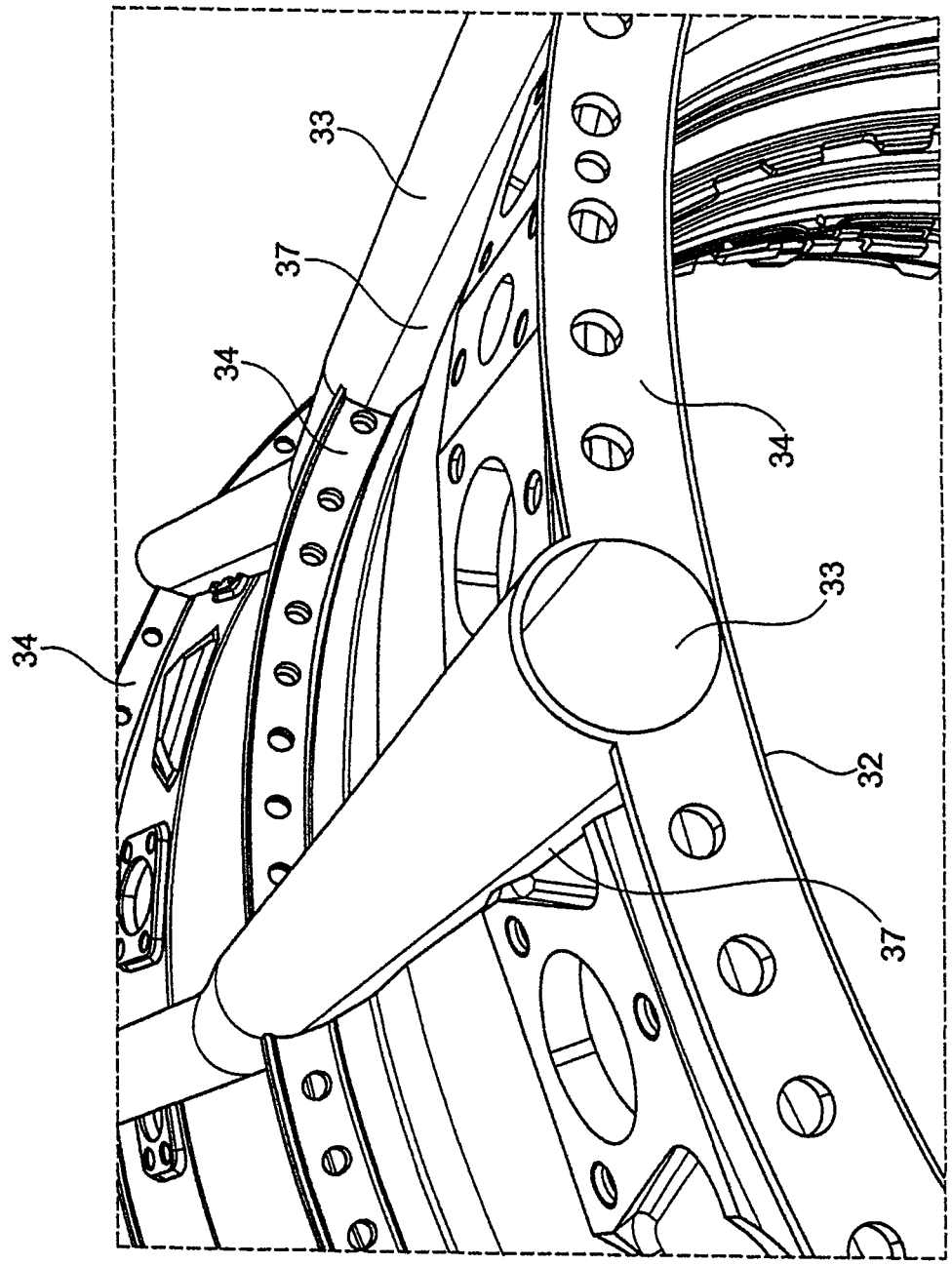

The present invention is described in the following in light of the accompanying drawing, showing an exemplary embodiment. In the drawing, FIG. 1 shows a schematic representation of a gas-turbine engine in accordance with the present invention, FIG. 2 shows a perspective outside view of a core engine casing in accordance with the present invention, FIGS. 3-5 show perspective partial views of the core engine casing illustrated in FIG. 2.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 7 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the core engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows a perspective representation of an exemplary embodiment of a core engine casing 21, which includes, in a simplified view, a compressor area 29, a combustion chamber area 30 and a turbine area 31. The individual areas 29, 30 and 31 are each connected by means of flanges 34. This is shown in detail in enlarged representation in FIGS. 3 to 5.

In FIGS. 3 and 5 in particular, it is shown that an outer wall 32 of the areas 29, 30, 31 of the core engine casing 21 is connected in one piece to cooling-air tubes 33. The cooling-air tubes 33 are thus integrated into the outer wall 32 and are in close contact with said outer wall 32. In the area of the flanges 34, suitable openings are provided for passing the cooling-air tubes 33 through said flanges 34.

As can be seen for example from FIG. 3, the outer wall 32 can be provided with a recess 35 for connecting the inner volume of the cooling-air tubes 33 to a suitable fitting or similar. Any free end areas of the cooling-air tubes 33 that occur can be closed by means of sealing elements 36 (see FIG. 4), not shown in detail. Angled cooling-air tubes 33 can be made by drilling from both sides (front and rear).

The figures furthermore show marginal webs 37, which can result from the one-piece production of the cooling-air tubes 33 and which serve to increase mechanical strength. The cooling-air tubes 33 can, as mentioned, be drilled or milled after the outer contour of the core engine casing 21 has been produced, for example using metal-cutting production methods.

LIST OF REFERENCE NUMERALS

1 Engine Axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Core engine casing
22 Compressor rotor blades
23 Stator vanes
24 Turbine rotor blades
25 - - -
26 Compressor drum or disk
27 Turbine rotor hub
28 Exhaust cone
29 Compressor area
30 Combustion chamber area
31 Turbine area
32 Outer wall
33 Cooling-air tube
34 Range
35 Recess
36 Sealing element
37 Marginal web

What is claimed is:

1. An aircraft gas turbine comprising:
a core engine casing for a core engine, the core engine casing including:
a compressor section,
a combustion chamber section, and
a turbine section,
each of the compressor section, combustion chamber section and turbine section being separate components and each including an outer wall,
a plurality of circumferentially extending flanges connecting the compressor section, combustion chamber section and turbine section together in axial succession to form the core engine casing having an overall outer wall assembled from the outer walls of each of the compressor section, combustion chamber section and turbine section,
a plurality of cooling-air tubes each having part sections integrally provided as one piece with the outer wall of each of the compressor section, combustion chamber section and turbine section, respectively,
the respective part sections separably connected to one another at joints between the compressor section, combustion chamber section and turbine section, with the plurality of cooling air tubes extending through the circumferentially extending flanges
the plurality of cooling-air tubes each extending in an axial direction relative to an engine axis,
the cooling-air tubes each providing outwardly closed air paths in the axial direction along the overall outer wall, with circumferential portions of the overall outer wall between adjacent ones of the axially extending cooling-air tubes being externally exposed.

2. The aircraft gas turbine in accordance with claim 1, wherein the plurality of cooling-air tubes are manufactured and finished using drilling and milling methods.

3. The aircraft gas turbine in accordance with claim 1, wherein the plurality of cooling-air tubes are premanufactured as separate tubes and connected in one piece to the core engine casing by joining methods.

4. The aircraft gas turbine in accordance with claim 1, wherein the plurality of cooling-air tubes are spread over a circumference of the core engine casing.

5. The aircraft gas turbine in accordance with claim 4, wherein the plurality of cooling-air tubes extend over differing axial portions of the core engine casing.

* * * * *